USO10009736B1

United States Patent
Chu et al.

(10) Patent No.: US 10,009,736 B1
(45) Date of Patent: Jun. 26, 2018

(54) METHOD AND APPARATUS FOR PERFORMING JOINT TRANSMISSIONS IN A WIRELESS NETWORK

(71) Applicant: Marvell International LTD., Hamilton (BM)

(72) Inventors: Liwen Chu, San Ramon, CA (US); Hongyuan Zhang, Fremont, CA (US); Hui-Ling Lou, Sunnyvale, CA (US); Lei Wang, San Diego, CA (US); Yakun Sun, Sunnyvale, CA (US); Jinjing Jiang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 431 days.

(21) Appl. No.: 14/639,477

(22) Filed: Mar. 5, 2015

Related U.S. Application Data (60) Provisional application No. 61/949,114, filed on Mar. 6, 2014, provisional application No. 62/054,692, filed on Sep. 24, 2014.

(51) Int. Cl.
*H04W 4/06* (2009.01)
*H04L 12/741* (2013.01)
(Continued)

(52) U.S. Cl.
CPC ............. *H04W 4/06* (2013.01); *H04L 45/74* (2013.01); *H04L 63/0428* (2013.01);
(Continued)

(58) Field of Classification Search
CPC ..... H04L 5/0007; H04L 23/02; H04L 1/0043; H04L 1/009; H04L 1/0091;
(Continued)

(56) References Cited

U.S. PATENT DOCUMENTS

2008/0247368 A1* 10/2008 Uppala ................ H04L 63/061
370/338
2014/0162601 A1* 6/2014 Kim ...................... H04W 12/06
455/411
(Continued)

OTHER PUBLICATIONS

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.
(Continued)

*Primary Examiner* — Marsha D. Banks Harold
*Assistant Examiner* — Natasha W Cosme (57) ABSTRACT

A first access point including a physical layer (PHY) module, a parameter module and a medium access control (MAC) module. The parameter module is configured to, via the PHY module, negotiate a first parameter with a second access point. A basic service set of the first access point overlaps a basic service set of the second access point. The first basic service set includes stations. The second basic service set includes one or more of the stations. The MAC module is configured to receive a first frame. The PHY module is configured to, based on the first parameter and during a joint transmission of the first frame by the first access point and the second access point, transmit the first frame to the stations according to a first address while the second access point transmits the first frame to the one or more stations according to the first address.

24 Claims, 8 Drawing Sheets

(51) Int. Cl.
  *H04L 29/06* (2006.01)
  *H04W 12/04* (2009.01)
  *H04W 40/02* (2009.01)
  *H04W 56/00* (2009.01)
(52) U.S. Cl.
  CPC .......... *H04W 12/04* (2013.01); *H04W 40/02* (2013.01); *H04W 56/0015* (2013.01)
(58) Field of Classification Search
  CPC ......... H04L 25/03834; H04L 25/03866; H04L 25/03987; H04L 5/0035; H04L 25/0204; H04L 25/0224; H04L 25/03343; H04L 5/0023; H04L 5/0032; H04L 5/0091; H04L 1/0071
  USPC .......................................................... 370/503
  See application file for complete search history.

(56) References Cited

U.S. PATENT DOCUMENTS

| | | | | |
|---|---|---|---|---|
| 2015/0009966 | A1* | 1/2015 | Lee | H04L 5/0035 370/336 |
| 2015/0288427 | A1* | 10/2015 | Wang | H04W 72/1273 370/329 |

OTHER PUBLICATIONS 802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.
IEEE Std 802.20/2008; IEEE Standard for Local and metropolitan area networks; Part 20: Air Interface for Mobile Broadband Wireless Access Systems Supporting Vehicular Mobility-Physical and Media Access Control Layer Specification; IEEE Computer Society; Sponsored by the LAN/MAN Standards Committee; Aug. 29, 2008; 1032 pages.
IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.
IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.
IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.
Kiran Gunnam et al.; "Multi-Rate Layered Decoder Architecture for Block LDPC Codes of the IEEE 802.11n Wireless Standard"; 2007; pp. 1645-1648.

* cited by examiner

METHOD AND APPARATUS FOR PERFORMING JOINT TRANSMISSIONS IN A WIRELESS NETWORK

CROSS-REFERENCE TO RELATED APPLICATIONS

This application claims the benefit of U.S. Provisional Application No. 61/949,114, filed on Mar. 6, 2014 and U.S. Provisional Application No. 62/054,692, filed on Sep. 24, 2014. The entire disclosures of the applications referenced above are incorporated herein by reference.

FIELD

The present disclosure relates to transmissions of neighboring access points in local area networks.

BACKGROUND

A basic service set (BSS) provides a basic building-block of an IEEE 802.11 wireless local area network (WLAN). In infrastructure mode, a single access point (AP) together with all associated stations (STAs) of the access point is referred to as a BSS. A coverage area of an access point is referred to as a basic service area (BSA). Multiple BSSs may exist in a geographical area, where the geographical area includes BSAs. Neighboring APs may have overlapping BSAs.

Each BSS is uniquely identified by a basic service set identification (BSSID). For a BSS operating in infrastructure mode, the BSSID is typically a medium access control (MAC) address of the AP. The BSSID may be generated by combining a 24 bit unique identifier of a manufacturer of the AP and an assigned 24-bit identifier for a radio chipset of the AP. Signals transmitted between an AP and stations of a BSS may indicate the BSSID of the AP.

Interference may occur between signals transmitted in overlapping BSAs. For example, a first AP may broadcast a first signal to first stations in a first BSA. A second AP may broadcast a second signal to second stations in a second BSA. The first signal may interfere with the second signal, if the first signal is transmitted while the second signal is transmitted. The first BSA may overlap the second BSA and for this reason the first AP and the second AP may be referred to as neighboring APs.

SUMMARY

A first access point is provided and includes a physical layer module, a parameter module and a medium access control module. The parameter module is configured to, via the physical layer module, negotiate a first parameter with a second access point. A basic service set of the first access point overlaps a basic service set of the second access point. The first basic service set includes stations. The second basic service set includes one or more of the stations. The medium access control module is configured to receive a first frame. The physical layer module is configured to, based on the first parameter and during a joint transmission of the first frame by the first access point and the second access point, transmit the first frame to the stations according to a first address while the second access point transmits the first frame to the one or more of the stations according to the first address.

In other features, a method of performing a joint transmission is provided. The method includes: negotiating a first parameter with a second access point via a physical layer module of a first access point; subsequent to the negotiating of the first parameter, receiving a first frame at a medium access control module of the first access point; and based on the first parameter and during the joint transmission of the first frame by the first access point and the second access point, transmitting the first frame from the first access point to stations according to a first address while the second access point transmits the first frame to one or more of the stations according to the first address. A first basic service set of the first access point overlaps a first basic service set of the second access point. The first basic service set includes the stations. The second basic service set includes the one or more of the stations.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Joint transmission of frames among neighboring APs may include spatial reuse in more than one BSS. Spatial reuse may include neighboring APs transmitting the same frames to provide a same traffic stream for multiple BSSs. Spatial reuse may include neighboring APs sharing one or more frequencies for the transmission of the frames. As a result, a station may receive multiple broadcast and/or multicast frames from multiple sources (or APs).

In a joint transmission, neighboring APs may transmit the same frames or different frames during a same period of time. Examples are disclosed herein to avoid and/or minimize interference between transmissions associated with neighboring APs. For example, if the APs are transmitting the same frames, the APs are synchronized to transmit the frames simultaneously.

As another example, if the APs are transmitting different frames, interference between transmissions of the APs is avoided by, for example: the APs performing a beamforming training process; the APs generating sectorized transmissions; and/or the APs using orthogonal frequency division multiple access (OFDMA) to dynamically assign subsets of subcarriers to the APs for transmissions by the APs. The beamforming training process may be referred to as a downlink (DL) multi-user (MU) multiple input multiple output (MIMO) beamforming training process. During the beamforming training process, beams of the APs are aligned such that the beams do not interfere with each other. This process allows a group of stations in overlapping BSSs to be DL MU MIMO receivers. Sectorized transmissions refer to the APs having respective allocated non-overlapping sectors in which to transmit signals. A sector may refer to a portion of a BSA, a whole BSA, or an area that includes a BSA. OFDMA prevents interference between transmitted signals of the APs by assigning respective subsets of subcarriers to the APs for transmissions by the APs. Overlapping BSSs include one or more of the same stations.

Although the following examples are primarily described with respect to neighboring APs transmitting the same frames, the examples and/or associated APs may be modified for transmission of different frames.

Figure 1:
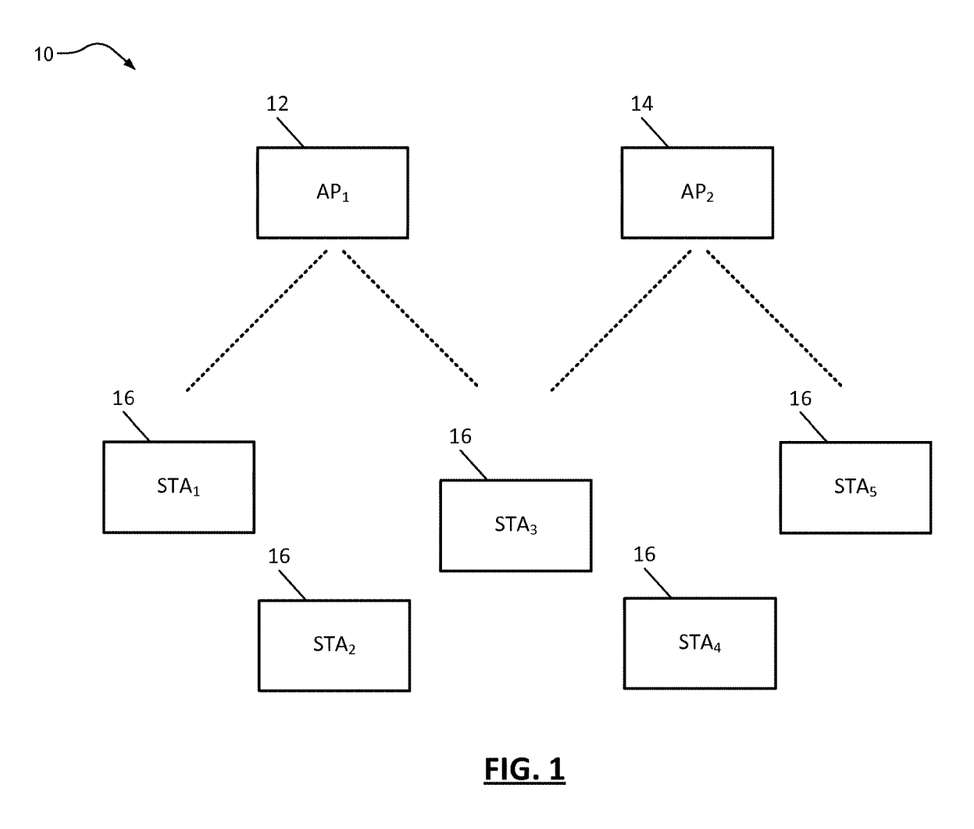
FIG. 1 is a functional block diagram of a wireless local area network including neighboring access points configured to perform joint transmission in accordance with the present disclosure.

FIG. 1 shows a wireless local area network (WLAN) 10 that includes neighboring APs 12, 14 and stations (STAs) 16. The APs 12, 14 may be referred to as and/or be implemented as group owners. As an example, the AP 12 and the stations $STA_1$, $STA_2$, $STA_3$ may be in a first basic service set (BSS). The AP 14 and the stations $STA_4$, $STA_5$ may be in a second BSS. The $STA_1$, $STA_2$, $STA_3$ may be in a first basic service area (BSA). The $STA_4$, $STA_5$ may be in a second BSA. The APs 12, 14 perform joint transmissions to one or more of the stations 16. The joint transmissions may include the AP 12 transmitting the same frames as the AP 14 or the AP 12 transmitting different frames than the AP 14. The frames may be transmitted by the APs 12, 14 to provide a single stream of frames to the one or more of the STAs 16.

If the frames are the same, the APs 12, 14 may be synchronized as described below to transmit the frames during a same period of time and/or simultaneously. If the frames are different and are transmitted during the same period of time, the APs 12, 14 may use one of the above-described techniques to prevent interference between the transmitted frames. This may include performing a beamforming training process or generating sectorized and/or OFDMA transmissions.

Although in FIG. 1 a certain number of APs, STAs, BSSs, and BSAs are shown, any number of APs, STAs, BSSs, and BSAs may be included in the WLAN 10. Also, each of the BSSs and BSAs may have any number of corresponding APs and STAs. Two or more of the BSAs may overlap. Any number of the BSAs may not overlap.

Figure 2:
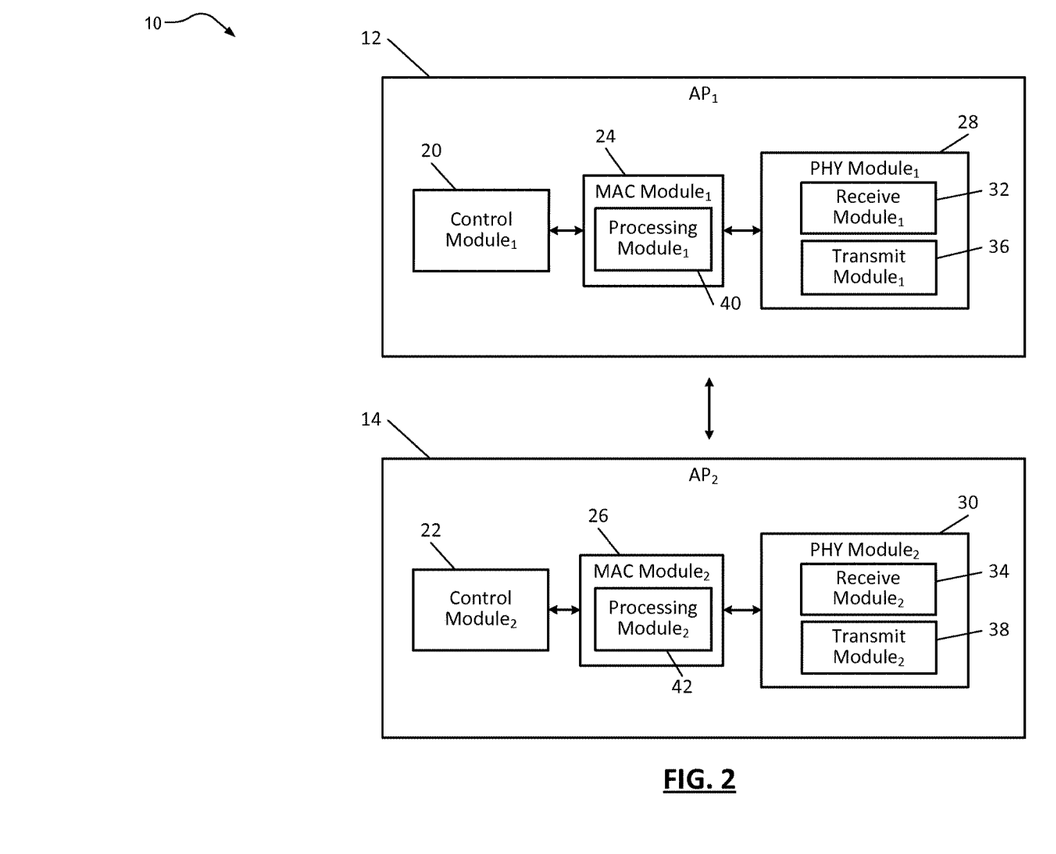
FIG. 2 is a functional block diagram of the neighboring access points of FIG. 1.

FIG. 2 shows the APs 12, 14. Information may be transferred between the APs 12, 14, as described below, to allow for the transmission of the same frames from both of the APs 12, 14 during a same time period. The APs 12, 14 then transmit the frames to stations based on this information. The information may include a start time of a service period, an end time of the service period, a duration of the service period, a multicast and/or broadcast address of an AP, a sequence number, a bandwidth, a modulation coding scheme (MCS), an indication of whether a synchronization signal is to be sent prior to each service period, a group temporal key, a group master key, and/or other suitable information.

The APs 12, 14 may be mobile devices, computers, appliances, cellular phones, and/or other network devices. The APs 12, 14 include respective control modules 20, 22, medium access control (MAC) modules 24, 26, and physical layer (PHY) modules 28, 30. The PHY modules 28, 30 include respective receive modules 32, 34 and transmit modules 36, 38. The receive modules 32, 34 and the transmit modules 36, 38 may include and/or be implemented as respective receivers and transmitters. The control modules 20, 22 transmit and receive frames to and from the MAC modules 24, 26. The MAC modules 24, 26 receive and transmit frames to and from the PHY modules 28, 30. The PHY modules 28, 30 transmit information to and from each other via the receive modules 32, 34 and the transmit modules 36, 38. The PHY modules 28, 30 also transmit the frames to STAs via the transmit modules 36, 38.

The MAC modules 24, 26 may include processing modules 40, 42. Although shown in the MAC modules 24, 26, the processing modules 40, 42 or portions of the processing modules 40, 42 may be included in and/or implemented by the PHY modules 28, 30. The APs 12, 14 and/or the corresponding control modules 20, 22, MAC modules 24, 26, and/or PHY modules 28, 30 may transmit different frames during a same period of time. This may include the APs 12, 14 and/or the control modules 20, 22, MAC modules 24, 26, and/or PHY modules 28, 30: performing a beamforming training process (e.g., a DL MU MIMO beamforming training process); generating sectorized transmissions; and/or using OFDMA to dynamically assign subsets of subcarriers to the APs 12, 14 for transmissions by the APs 12, 14. The transmit modules 36, 38 may align respective beams and/or direct the beams in respective allocated sectors of the APs 12, 14. The beams may be directed to different stations and/or different BSAs.

Figure 3:
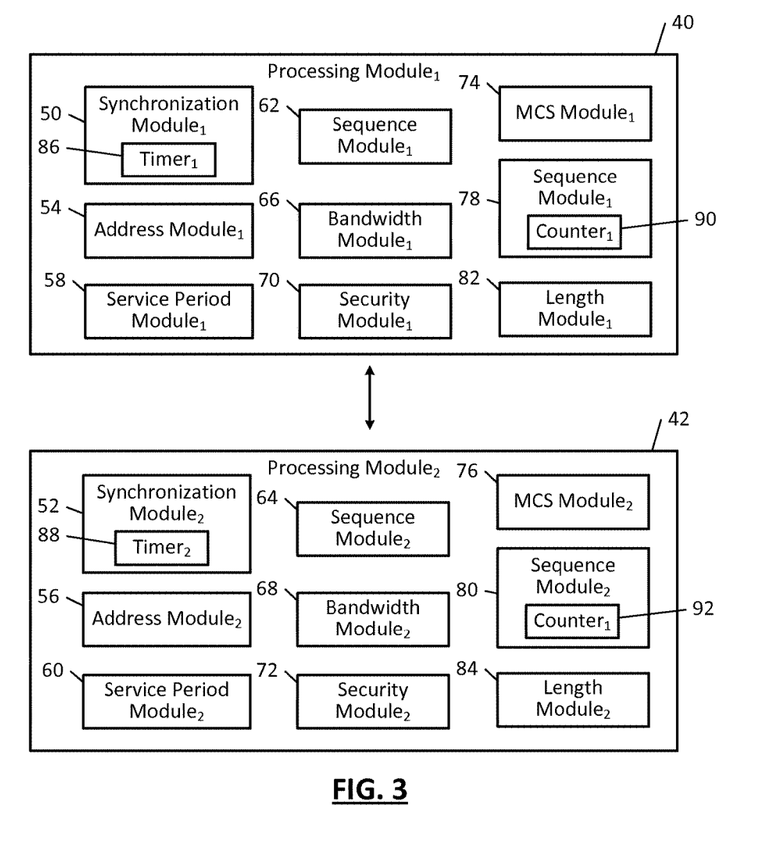
FIG. 3 is a functional block diagram of processing modules of the neighboring access points of FIGS. 1-2.

FIG. 3 shows the processing modules 40, 42. The processing modules 40, 42 include respective synchronization modules 50, 52, address modules 54, 56, service period modules 58, 60, sequence modules 62, 64, bandwidth modules 66, 68, security modules 70, 72, MCS modules 74, 76, sequence modules 78, 80, and length modules 82, 84. Any of the modules 50, 52, 54, 56, 58, 60, 62, 64, 66, 68, 70, 72, 74, 76, 78, 80, 82, 84 may be implemented in the MAC modules 24, 26, the PHY modules 28, 30, and/or a combination of the MAC modules 24, 26 and the PHY modules 28, 30 of FIG. 2.

The synchronization modules 50, 52 may include timers 86, 88. The synchronization modules may perform a timer synchronization function (TSF) or any other method to synchronize the timers 86, 88, such that the timers 86, 88 provide TSF time stamps.

The address modules 54, 56 may determine multicast and/or broadcast (M/B) addresses for transmitted frames. If APs of the address modules 54, 56 are transmitting the same frames, the frames transmitted by the first AP have the same M/B addresses and/or transmitter MAC addresses as the same frames transmitted by the second AP. The M/B addresses and/or the transmitter MAC addresses may be included as address fields in a MAC protocol data unit (MPDUs) of the frames.

The service period modules 58, 60 may determine service period start times, end times, and durations. The service period modules 58, 60 may also determine lengths of periods between successive service periods. If the same frames are transmitted by different APs, the service periods for the frames transmitted by the first AP are the same as the service periods for the same frames as transmitted by the second AP. The same service periods have the same start times, end times, and durations.

The bandwidth modules 66, 68 may select a bandwidth and/or one or more frequencies over which to transmit frames. If the same frames are transmitted by different APs, the bandwidth of the first AP is the same as the bandwidth of the second AP for the frames. The same bandwidth may refer to the same one or more frequencies over which each of the APs transmit the frames.

The security modules 70, 72 may access and/or generate a group temporal keys (GTKs) and group master keys (GMKs). If the same frames are transmitted by different APs, the security modules 70, 72 may agree on a same GTK and/or GMK for the transmitted frames. The GTK and/or GMK may be used for encryption of the frames prior to transmission. The GTKs may be generated based on the GMKs.

The MCS modules 74, 76 may select modulation and coding schemes for the transmission of frames. If the same frames are transmitted by different APs, the MCS modules 74, 76 may select a same modulation and coding scheme for the transmission of the frames. As an example, the MCS may be a 20 megahertz (MHz) or a 40 MHz coding scheme or other coding scheme.

The sequence modules 78, 80 may determine sequence numbers of frames to be transmitted via respective counters 90, 92. Receivers of stations receiving the frames may determine whether the frames are new or are duplicate frames based on the corresponding sequence numbers. If the same frames are transmitted by different APs, the sequence modules 78, 80 share a same sequence number. As a result, a frame transmitted by one of the APs has a same sequence number as the same frame transmitted by another one of the APs. The sequence numbers may be included as sequence control fields in MPDUs of the frames.

The length modules 82, 84 may determine and/or control lengths of aggregated-MPDUs (A-MPDUs) or MPDU. If the same frames are transmitted by different APs, the length modules 82, 84 may assure that an A-MPDU or a MPDU transmitted by a first AP has a same length as a same A-MPDU or MPDU transmitted by a second AP.

Operations of the modules 50, 52, 54, 56, 58, 60, 62, 64, 66, 68, 70, 72, 74, 76, 80, 82, 84 are further described below with respect to FIGS. 4-7. Although the following FIGS. 4-7 are primarily described with respect to two APs, more than two APs may be involved in the described parameter negotiations, joint transmissions, etc. Also, although the following examples are primarily described with respect to two stations, any number of stations may be involved in the joint transmission. In addition, the tasks performed by the APs may be performed by corresponding MAC modules and/or PHY modules, such as by any of the above described modules 24, 26, 28, 30, 40, 42, 50, 52, 54, 56, 58, 60, 62, 64, 66, 68, 70, 72, 74, 76, 80, 82.

Figure 4:
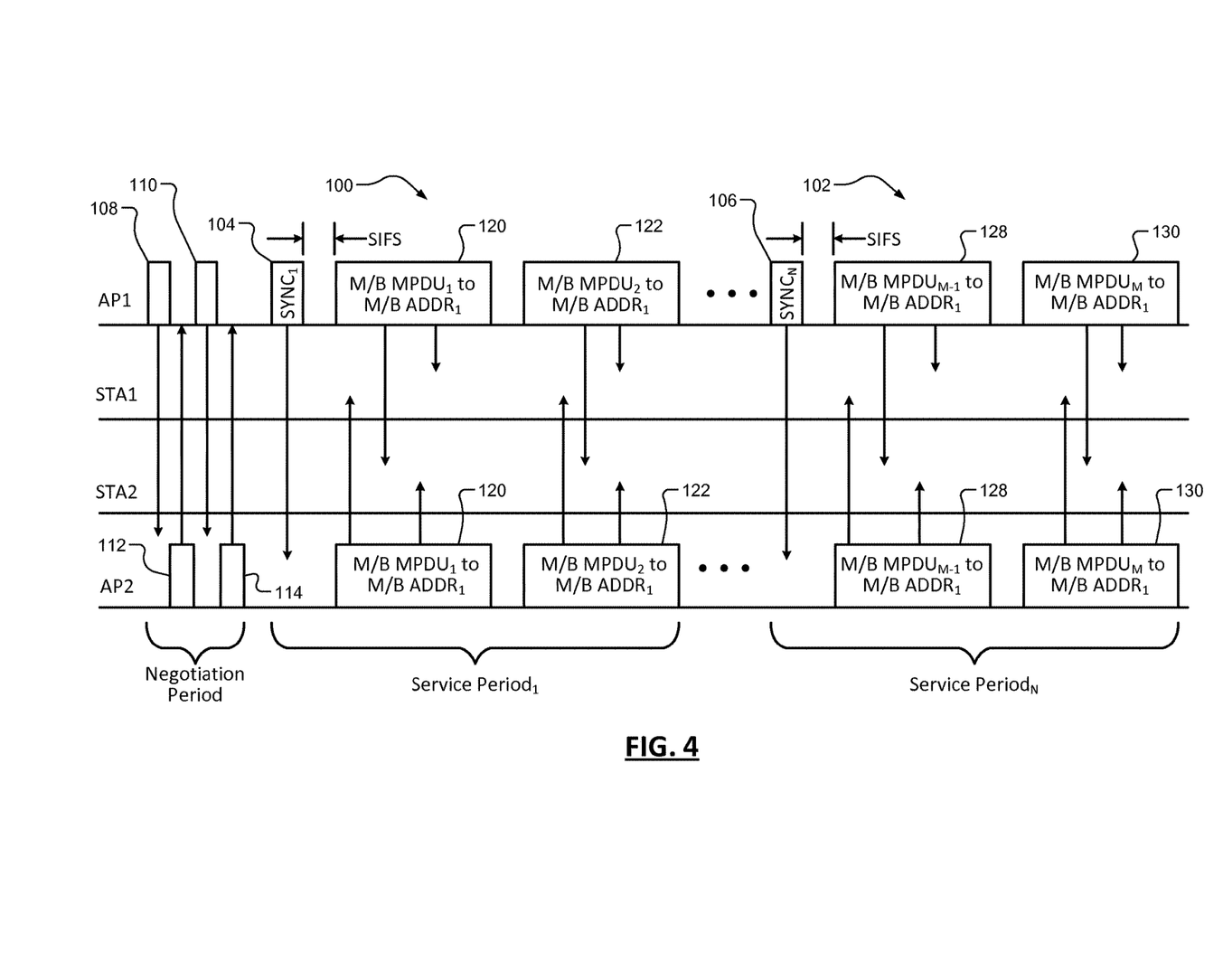
FIG. 4 is a signal diagram illustrating joint transmissions preceded by synchronization signals in accordance with the present disclosure.

FIG. 4 shows a signal diagram illustrating joint transmissions 100, 102 preceded by synchronization signals 104, 106. FIG. 4 shows signals transmitted by AP1, AP2 during a negotiation period and prior to service periods of the joint transmissions 100, 102. During the negotiation period AP1 and AP2 may negotiate parameters, which are used during the service periods to transmit frames. Signals (designated 108, 110, 112, 114) are transmitted between AP1 and AP2 during negotiation of the parameters. Any number of negotiation signals may be transmitted. The negotiation signals may indicate possible values for each of the parameters that are acceptable to AP1 and/or AP2 and/or may indicate a code corresponding to the acceptable parameter values. AP1 and AP2 may then determine the parameter values based on the code. AP1 and AP2 may select parameter values that are acceptable to both AP1 and AP2. In one embodiment, one of AP1 and AP2 performs as a master device and the other one of AP1 and AP2 performs as a slave device, such that the master device selects the appropriate parameter values and AP1 and AP2 operate based on the selected parameter values. AP1 and AP2 may negotiate whether a synchronization (SYNC) frame is to be transmitted prior to each service period, as shown in FIG. 4. A SYNC frame may not be transmitted, as further described below.

The parameters may be set such that: the transmission of the same frames by AP1, AP2 is synchronized; the frames are transmitted using a same bandwidth; and the frames have the same information and length. The parameters may include a service period start time, a service period end time, a duration of a service period, a length of a period between successive service periods, a M/B address (or group address), a transmitter MAC address, a sequence number, a bandwidth, a MCS, a GTK, a GMK, and/or a length of a A-MPDU. The parameters may also indicate whether a SYNC frame is to be transmitted and/or whether a SYNC frame is to be transmitted prior to each service period. The parameters may further indicate which one of the APs (e.g., AP1 or AP2) is to transmit the SYNC frames. If a SYNC frame is not to be transmitted, the parameters may indicate when a service period or transmission of M/B MPDUs is to begin. As another alternative, AP1 and AP2 may begin transmission of frames a predetermined period subsequent to performing the time synchronization function. The parameters may also indicate lengths of periods between service periods. The lengths of periods between service periods indicates when subsequent service periods are to begin and thus when to transmit subsequent frames (or M/B MPDUs).

Each of the service periods are shown as beginning with transmission of a SYNC frame. The SYNC frames are transmitted at the beginning of the service periods by the preselected AP (e.g., AP1). The SYNC frame indicates to AP2 (and/or other APs) that one or more M/B MPDUs are to be transmitted by AP1 and AP2 (and/or other APs) a short interframe space (SIFS) period following the transmission of the SYNC frame. Example M/B MPDUs 120, 122 for a first service period and M/B MPDUs 128, 130 are shown for a last service period. Subsequent to the SIFS period, AP1 and AP2 (and/or other APs) transmit to the stations STA1, STA2 (and/or other stations) the M/B MPDUs for the corresponding service period. The M/B MPDUs are transmitted to the same M/B address (or group address). The M/B address refers to an address that is associated with STA1 and STA2 (and/or other stations). Start times and end times of the transmission of the M/B MPDUs by AP1 and AP2 match (i.e. are the same). This assures that transmission of the M/B MPDUs by AP1 does not interfere with the transmission of the M/B MPDUs by AP2, but rather supplements or provides a combined signal with increased signal strength.

Simultaneous joint transmission of M/B frames can improve MAC efficiency when neighboring BSSs and/or Wi-Fi™ groups have the same M/B frames to transmit. For example, transmission of the same frames by the same APs in the BSSs and/or Wi-Fi™ groups can minimize the number of times that frames are retransmitted.

Transmission of SYNC frames as described aids in synchronizing APs and corresponding joint transmissions. The SYNC frames may be transmitted as legacy (or duplicate) physical layer convergence protocol (PLCP) protocol data units (PPDUs). Legacy stations and high-efficiency (HEW) stations may set a network allocation vector (NAV) after receiving the SYNC frames. MAC layers (or modules) of the stations setting the NAV may determine periods and transmission times of frames to be received. This is an indication to the stations of when a corresponding transmission medium is to be busy. The stations defer from transmitting on the same medium during the periods that the medium is busy. As used herein, the term "transmission medium" may refer to a channel or one or more frequencies.

Enhanced distribution channel access (EDCA) based medium access may be used by, for example, the MAC modules 24, 26 of FIG. 2 to trigger transmission of SYNC frames for joint transmission purposes. Traditionally, with EDCA, high-priority traffic has a higher chance of being sent than low-priority traffic. A station with high-priority frames waits less time than a station with low-priority frames. EDCA provides contention-free access to a channel for a period referred to as a transmit opportunity (TXOP). A TXOP is a bounded time interval during which a station can send one or more frames without contention. The SYNC frames may be transmitted during the contention-free access periods.

The SYNC frames may also include M/B addresses or transmitter MAC address for the frames transmitted during a joint transmission. The transmitter MAC address (TA) may be addresses of one of the APs (e.g., the AP sending the SYNC frames) and/or MAC addresses of a station. The SYNC frames may further include sequence numbers of the frames and a bandwidth and/or MCS used to transmit the frames. This can increase transmission flexibility by allowing addresses, sequence numbers, bandwidths, and MCSs to be different for each service period of the joint transmission. With a SYNC frame, a signal field SIG of a PPDU may be simplified, since the above-stated information included in the SYNC frame does not need to be included in the PPDU.

Although not shown in FIG. 4, AP2 and/or other APs receiving the SYNC frames may transmit acknowledge (ACK) frames to AP1 in response to the SYNC frames. The ACK frames may be sent subsequent to reception of the SYNC frames and prior to transmission of M/B MPDUs. The SYNC frames may indicate the information to include in the ACK frames. The SYNC frames may also include start times for the ACK frames, end times for the ACK frames, durations and/or lengths of the ACK frames, etc. This assures that when more than one AP is responding to a SYNC frame, the ACK frames sent back to AP1, in response to the SYNC frame, are the same. The timing information provided for the ACK frames also assures that the ACK frames are transmitted simultaneously to AP1. The information included in the ACK frames may include a MAC address of AP1, a unique ID of AP1, a unique ID for one or more frames to be sent from AP1 to the APs, a group address associated with the APs responding to AP1, and/or other suitable information.

Figure 5:
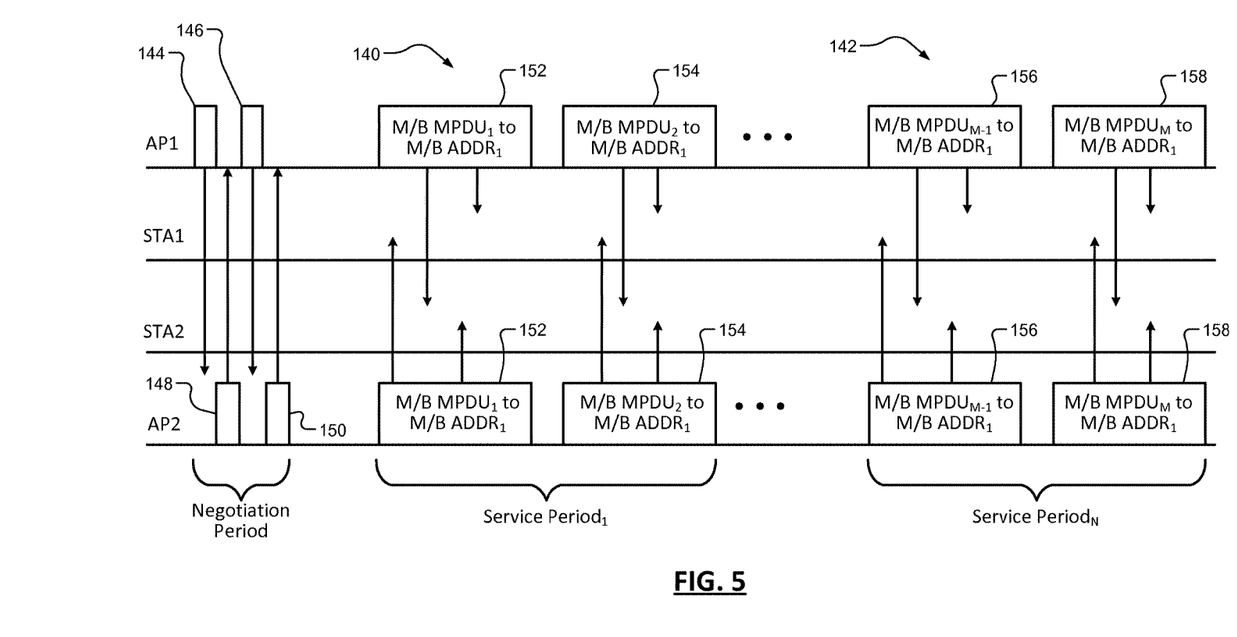
FIG. 5 is a signal diagram illustrating joint transmissions without synchronization signals in accordance with the present disclosure.

FIG. 5 shows a signal diagram illustrating joint transmissions 140, 142 without synchronization signals. A negotiation period is shown followed by service periods. AP1 and AP2 transmit negotiation signals (designated 144, 146, 148, 150) during the negotiation period to negotiate parameters, which are used during the service periods to transmit frames. Subsequent to the negotiation period, AP1 and AP2 transmit M/B MPDUs 152, 154, 156, 158 in corresponding service periods. The negotiated parameters in addition to indicating that SYNC frames are not to be transmitted may also indicate when to begin each of the service periods and/or transmission of the M/B MPDUs. The negotiation frames may indicate a predetermined amount of time from an end of the negotiation period or a predetermined amount of time from an end of a TSF period. A TSF may be performed by AP1 and AP2 prior to, during or subsequent to the negotiation period. The TSF is performed to assure synchronization of AP1 and AP2.

Figure 6:
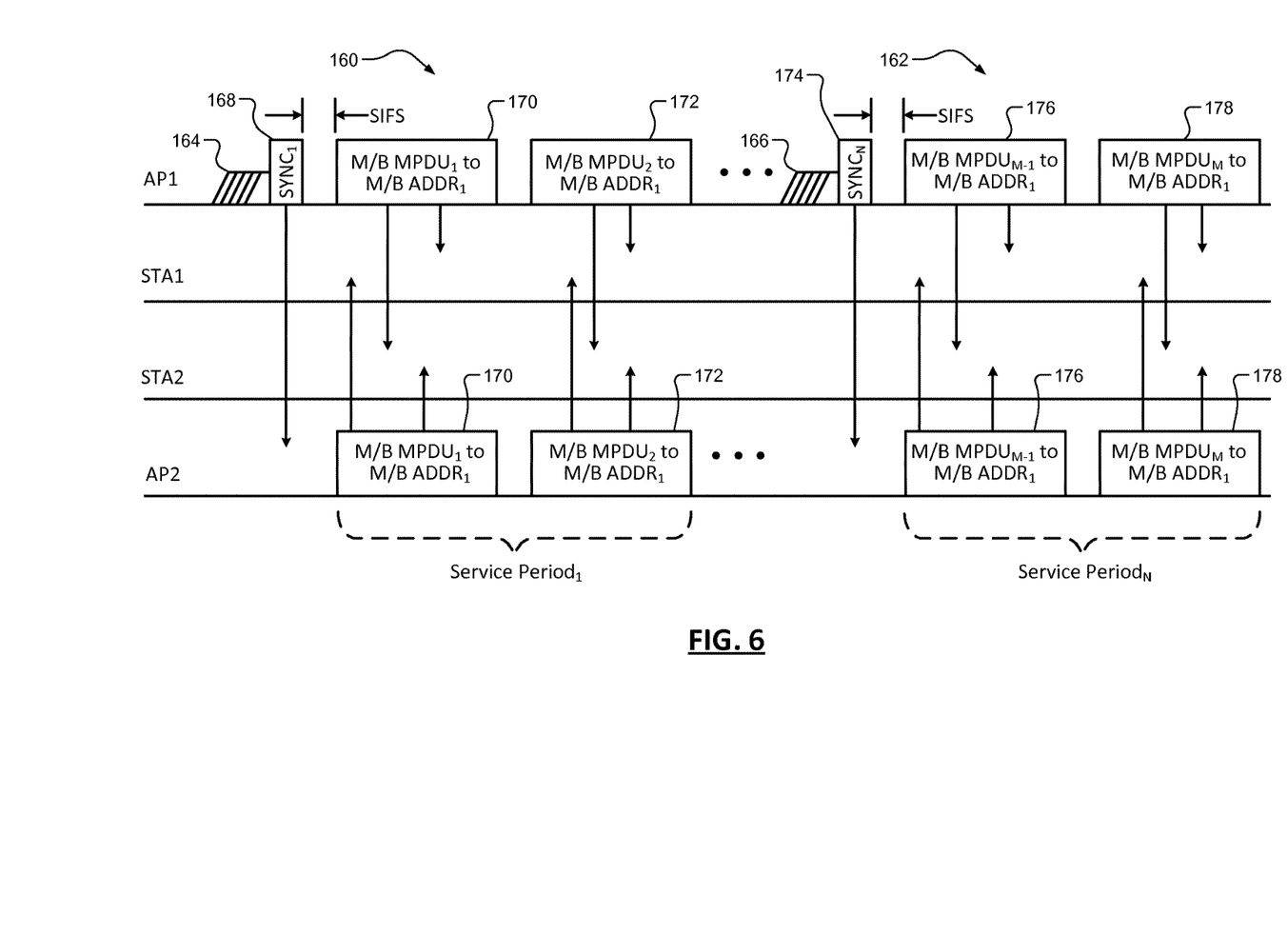
FIG. 6 is a signal diagram illustrating joint transmissions performed subsequent to backoff periods and in accordance with the present disclosure.

FIG. 6 shows a signal diagram illustrating joint transmissions 160, 162 performed subsequent to backoff procedures 164, 166. In order to avoid collisions between frames transmitted by AP1 and AP2 and other traffic on a transmission medium, AP1 and/or AP2 may perform a backoff procedure. As an example, AP1 may detect whether a transmission medium is busy. If the transmission medium is busy, AP1 may perform the backoff procedure. During the backoff procedure, AP1 may wait a random period of time prior to proceeding with transmitting a SYNC frame 168 and/or one or more M/B MPDUs 170, 172. Subsequent to the random period, AP1 may then transmit the SYNC frame 168. The backoff procedure 164 may include the random period. Subsequent to each service period another backoff procedure may be performed depending on whether the transmission medium is busy. A subsequent backoff procedure 166 is shown followed by a SYNC frame 174 and M/B MPDUs 176, 178.

Although FIG. 6 shows service periods, no service periods may exist. For example, the AP1 and AP2 may not negotiate information regarding service periods before transmitting SYNC frame. AP1 and AP2 may simply begin transmission of the M/B MPDUs 170, 176 SIFS (or predetermined periods) after the transmission of the SYNC frames 168, 174. This may occur regardless of whether backoff procedures are performed.

Figure 7:
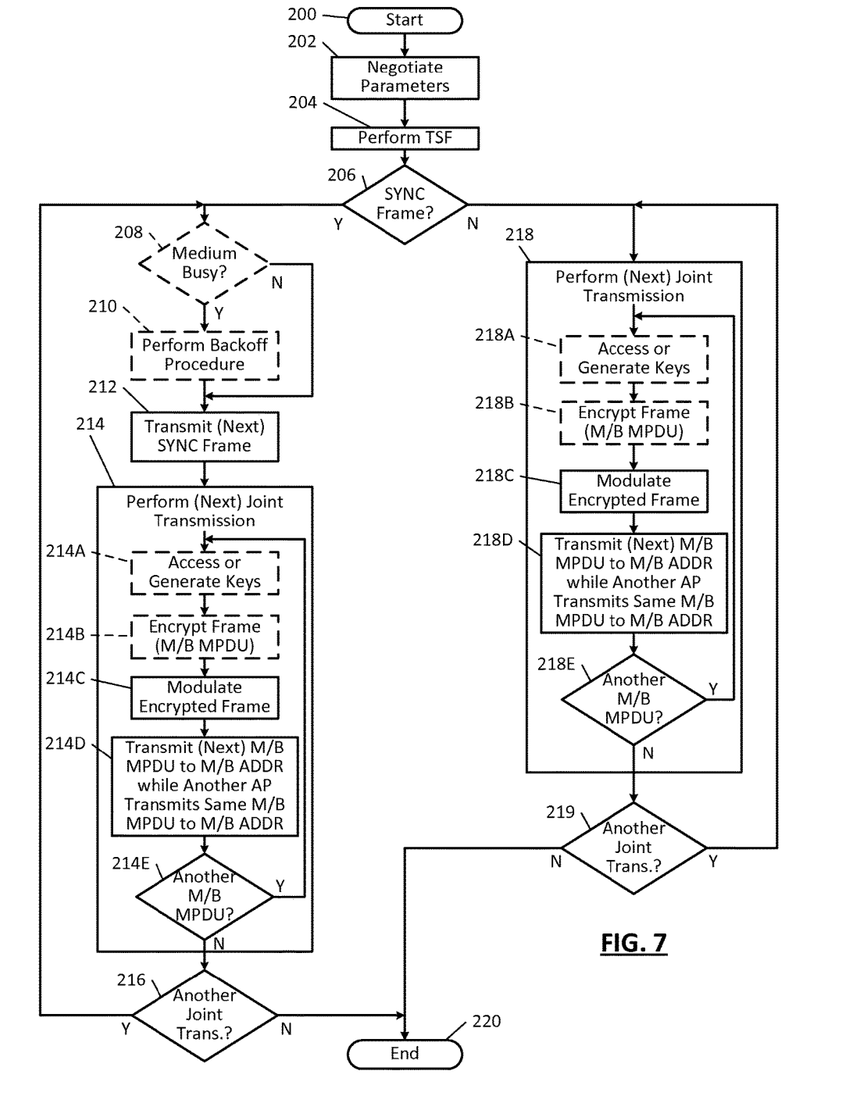
FIG. 7 illustrates a joint transmission method in accordance with the present disclosure.

The systems disclosed herein may be operated using numerous methods, an example method is illustrated in FIG. 7. FIG. 7 shows a joint transmission method. Although the following tasks are primarily described with respect to the implementations of FIGS. 1-6, the tasks may be easily modified to apply to other implementations of the present disclosure. The tasks may be iteratively performed. The following tasks may be implemented by MAC modules (e.g., the MAC modules 24, 26), PHY modules (e.g., the PHY modules 28, 30) and/or corresponding modules (e.g., the modules 50, 52, 54, 56, 58, 60, 62, 64, 66, 68, 70, 72, 74, 76, 78, 80, 82, 84).

The method may begin at 200. At 202, APs (e.g., any of the APs disclosed herein) may negotiate parameters. The parameters may include a service period start time, a service period end time, a duration of a service period, a length of a period between successive service periods, a M/B address (or group address), a transmitter MAC address, a sequence number, a bandwidth, a MCS, a GTK, a GMK, a length of a MPDU, a length of a A-MPDU and/or other parameters disclosed herein. The parameters may indicate the MPDUs or A-MPDUs to transmit. This may include addresses of the MPDUs and/or the A-MPDUs.

Traditionally, if different APs were to transmit A-MPDUs, lengths of the A-MPDUs may be different. By negotiating a length of the A-MPDU as disclosed herein, the APs transmit A-MPDUs having a same length. In one embodiment, one of the parameters indicates whether A-MPDUs are transmitted during all service periods or whether one or more service periods do not include an A-MPDU. This parameter may indicate whether an A-MPDU is transmitted in one or more of the service periods and/or whether only A-MPDUs are transmitted during the service periods. An A-MPDU may include multiple MPDUs wrapped in an IEEE 802.11 PPDU. The MPDUs in an A-MPDU may indicate the same receiving MAC (or group) address and same transmitting MAC address.

The parameters may also indicate whether a SYNC frame is to be transmitted prior to each service period. The parameters may further indicate which one of the APs is to transmit the SYNC frames. If a SYNC frame is not to be transmitted, the parameters may indicate when a service period or transmission of M/B MPDUs is to begin. The parameters may also indicate lengths of periods between service periods.

At 204, the APs may perform a TSF via synchronization modules and corresponding timers of the APs. Task 204 may be performed prior to, during or subsequent to task 202.

At 206, the MAC modules or other modules of the APs may determine if one or more SYNC frames are to be generated, task 208 may be performed, otherwise task 218 may be performed.

At 208, the AP (first AP) that is to transmit a SYNC frame may determine whether a transmission medium on which M/B MPDUs are to be transmitted is busy. If the transmission medium is busy, task 210 may be performed, otherwise task 212 may be performed. Tasks 208-210 may not be performed. At 210, the first AP may perform a backoff procedure, as described above.

At 212, the first AP generates and transmits the SYNC frame. This may be a first SYNC frame or may be a next SYNC frame if multiple joint transmissions are to be performed. The joint transmissions may have corresponding service periods. The SYNC frame may include one or more of the parameters. The SYNC frame may indicate: a length of one or more A-MPDUs; whether an A-MPDU is transmitted in a service period; and whether only A-MPDUs are transmitted in a service period. The A-MPDU indications provided at 202 and/or at 212 assure that, during the joint transmission performed at 214, one of the APs is not transmitting an A-MPDU while another one of the APs is not transmitting an A-MPDU.

At 214, a joint transmission is performed. This may be a first joint transmission or may be a next joint transmission if multiple joint transmissions are performed. The following tasks 214A and 214B may be performed if M/B MPDUs to be transmitted are encrypted by MAC modules of the APs. In one embodiment, frames are not encrypted by the MAC modules. The frames may be encrypted prior to being received by the MAC modules. For example, the frames (or M/B MPDUs) may be encrypted in layers above MAC layers, such as in an Internet protocol (IP) layers (or network layers) of the APs.

At 214A, security modules of the APs access or generate keys (e.g., a GTK and/or a GMK). The GTK may be a random value assigned by a multicast/broadcast source (e.g., the security module of one of the APs). The GTK and GMK of the first AP matches the GTK and GMK of the other one or more APs (e.g., second AP). This assures that the encryption performed by the APs of a frame results in a same encrypted frame. The GMK may be an auxiliary key that is used to derive the GTK. During the above negotiation of the parameters at 202, the APs may have negotiated the GTK and/or the GMK.

At 214B, the security modules receive or access and encrypt the same M/B MPDU (or content) using the agreed on GTK and/or GMK to provide two encrypted versions of the M/B MPDU. The M/B MPDU may be received by the APs from the same source and/or the APs may access the M/B MPDUs from the same source (e.g., a memory accessible to the APs). As an alternative, the APs may store and/or be capable of generating the same M/B MPDU. The M/B MPDUs may be aggregated as an A-MPDU. The receiving, accessing and/or encrypting may be based on one or more of the above-stated parameters. The first encrypted version matches (i.e. is the same as) the second encrypted version.

At 214C, if not already done during the encryption of the M/B MPDU, the security modules and/or MAC modules modulate the encrypted M/B MPDUs. Tasks 214B and/or 214C may be performed based on a MCS, agreed to during task 202. Each of the APs may notify the stations to which the M/B MPDUs are to be transmitted of the GTK. This GTK or other key information may be transmitted to the stations separate from the M/B MPDUs via beacons, or other special management action frames. The stations may then use the GTK and/or other key information to decrypt the M/B MPDUs received from the APs.

At 214D, each of the APs transmits the encoded versions of the M/B MPDU. The encoded versions of the M/B MPDU may be first or next encoded versions of the M/B MPDU depending upon whether multiple M/B MPDUs are transmitted during a current joint transmission. The encoded versions of the M/B MPDU are transmitted to the same M/B (or group) address for the stations that are to receive the encoded M/B MPDU.

Figure 8:
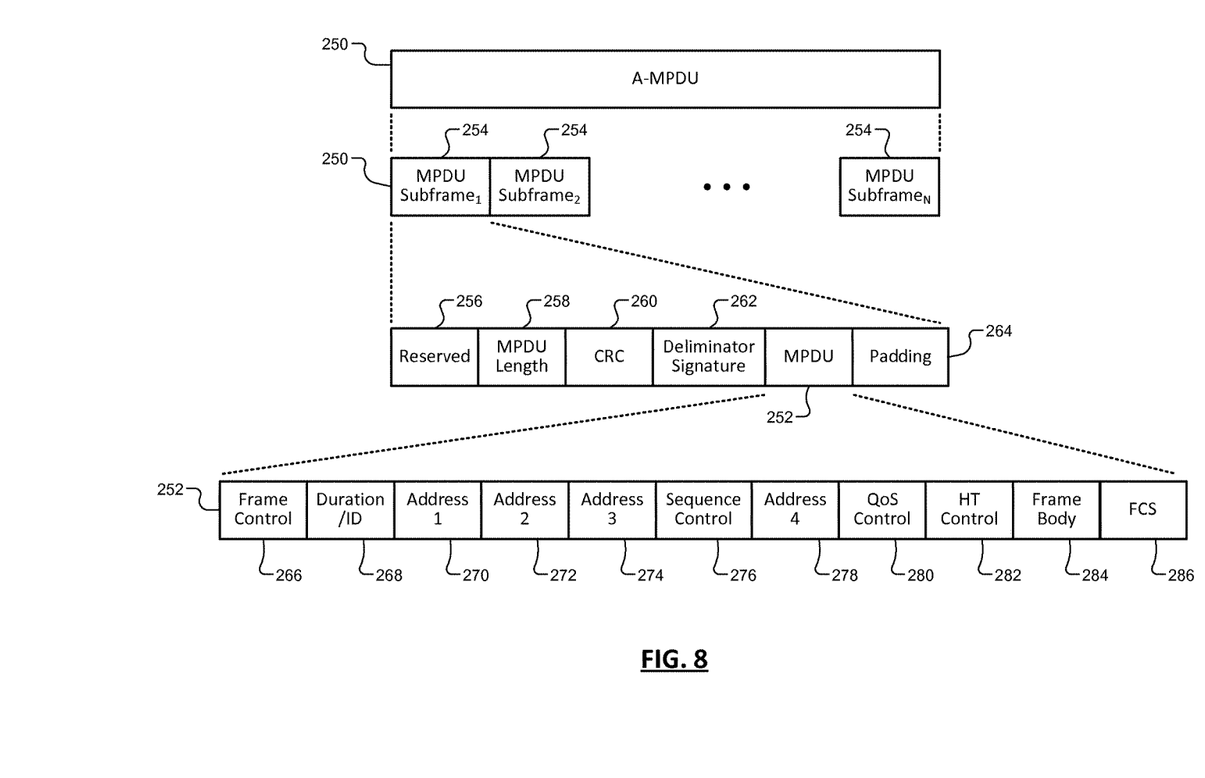
FIG. 8 illustrates a format of an aggregate medium access control protocol data unit (A-MPDU) including a format of a MPDU.

FIG. 8 shows an example format of an A-MPDU 250 and an example format of a MPDU 252. The A-MPDU 250 may include multiple MPDU subframes 254. Each of the MPDU subframes may include a reserved field 256, a MPDU length field 258, a cyclical redundant check (CRC) field 260, a deliminator signature 262, a MPDU (e.g., the MPDU 252), and padding 264. The MPDU length field 258 may indicate a length of the MPDU. The CRC field includes CRC bits. The deliminator signature 262 is used to detect a MPDU deliminator in the A-MPDU. The MPDU deliminator includes the MPDU length field 258, the CRC field 260 and the deliminator signature 262.

Each of the MPDUs may include a frame control field 266, a duration/identifier field 268, an address 1 field 270, an address 2 field 272, an address 3 field 274, a sequence control field 276, an address 4 field 278, a quality of service (QoS) control field 280, a HT control field 282, a frame body 284, and a FCS field 286. The frame control field 266 may have multiple subfields and may indicate information such as: a protocol version to be used for the corresponding frame; a function (management, control, data) of the frame; a meaning of address 4; a direction of flow of the frame; an AP power mode; an indication of whether the frame is encrypted; etc. The duration/identifier field 268 may be used for virtual carrier-sense, legacy power management, and contention-free period purposes.

The address fields 270, 272, 274, 278 identify certain addresses. The address 1 field 270 identifies a receiver (or group) MAC address. The address 2 field 272 which may be a basic service set identifier (BSSID). The address 3 field 274 identifies a destination or source MAC address. As an example, the address 3 field 272 may be a source address of the originating source of the frame and the address 2 field 274 may be a transmitter address of a radio of the AP transmitting the frame. The address 2 field 272 and the address 3 field 274 for a first AP are traditionally different than the address 2 field 272 and the address 3 field 274 for a second AP. However, as disclosed herein the encoded versions of the M/B MPDUs include the same address 2 field 272 and the address 3 field 274. The address 2 field 272 and the address 3 field 274 and/or other addresses may be determined during the negotiation performed at 202 and/or are indicated in the SYNC header. As an example, the address 2 field 272 and the address 3 field 274 of the encoded version of the M/B MPDUs transmitted by the APs may be the MAC address or radio address of the first AP. The address 4 field 278 may be a destination address of a final destination of the frame, or other suitable address.

Causing the APs to transmit M/B MPDUs with the same address 2 and address 3 fields aids in assuring that the APs transmit the same M/B MPDUs. As an alternative to the address 2 and address 3 fields having addresses of one of the APs, the address 2 and address 3 fields may include a predetermined "dummy" or "wildcard" MAC address, such as "FFFFFFFFFFFF".

Each of the APs may signal the corresponding stations in BSSs of the APs the address 2 and/or address 3 fields used in the joint transmissions. These signals are transmitted to the stations separate from the M/B MPDUs. The address 2 and address 3 fields may be indicated in beacons or other special management action frames.

Traditionally, the sequence control field 276 includes a sequence number that remains the same for all transmissions of the corresponding frame. The sequence control field 276 is used by a receiver to determine if the received frame is a new frame or a duplicate frame. Frames transmitted by different APs may have different sequence numbers. The sequence numbers may be generated by an AP based on a sequence counter. The APs of the method of FIG. 7 may however share a same sequence number, which may be generated based on a same sequence counter (e.g., one of the counters 90, 92 of FIG. 3). The sequence number may be determined and/or indicated during task 202 and/or in the SYNC header. This also assures that the APs transmit the same M/B MPDUs.

The quality of service (QoS) control field 280 may include subfields, such as a traffic indicator, an end of service period, an ACK policy subfield, a reserved field, and/or other fields. The high-throughput (HT) control field 282 which indicates signaling information for IEEE 802.11n and/or 802.11ac applications. The frame body 284 may include an aggregate media access control service data unit (A-MSDU). The frame check sequence (FCS) field 286 is an error-detecting code added to a frame. The FCS field is used by a station receiving the frame to determine whether there is an error in the frame as received. When a station receives a frame, the station may calculate and verify the FCS value. If the calculated FCS value matches the received FCS value, then an error does not exist in the frame.

Referring again to FIG. 7, at 214E, the MAC modules of the APs may determine whether another M/B MPDU is to be transmitted. If another M/B MPDU is to be transmitted, task 214A may be performed, otherwise task 216 may be performed. At 216, the MAC modules of the APs may determine whether another joint transmission is to be performed. Task 208 may be performed if another joint transmission is to be performed, otherwise the method may end at 220.

At 218, a joint transmission is performed. This may be a first joint transmission or may be a next joint transmission if multiple joint transmissions are performed. The following tasks 218A and 218B may be performed if M/B MPDUs to be transmitted are encrypted by the MAC modules of the APs. In one embodiment, frames are not encrypted by the MAC modules. The frames may be encrypted prior to being received by the MAC modules. For example, the frames (or M/B MPDUs) may be encrypted in layers above the MAC layers, such as in an Internet protocol (IP) layers (or network layers) of the APs.

At 218A, the security modules of the APs access or generate keys (e.g., a GTK and/or a GMK). The GTK and GMK of the first AP matches the GTK and GMK of the other one or more APs (e.g., second AP). During the above negotiation of the parameters at 202, the APs may have negotiated the GTK and/or the GMK.

At 218B, the security modules receive or access and encrypt the same M/B MPDU (or content) using the agreed on GTK and/or GMK to provide two encrypted versions of the M/B MPDU. The M/B MPDU may be received by the APs from the same source and/or the APs may access the M/B MPDUs from the same source (e.g., a memory accessible to the APs). As an alternative, the APs may store and/or be capable of generating the same M/B MPDU. The M/B MPDU may be an A-MPDU. The receiving, accessing and/or encrypting may be based on one or more of the above-stated parameters. The first encrypted version matches (i.e. is the same as) the second encrypted version.

At 218C, if not already done during the encryption of the M/B MPDU, the security modules and/or MAC modules modulate the encrypted M/B MPDUs. Tasks 218B and/or 218C may be performed based on a MCS, agreed to during task 202. Each of the APs may notify the stations to which the M/B MPDUs are to be transmitted of the GTK used at 218B. This GTK or other key information may be transmitted to the stations separate from the M/B MPDUs via beacons, or other special management action frames. The stations may then use the GTK and/or other key information to decrypt the M/B MPDUs received from the APs.

At 218D, each of the APs transmits the encoded versions of the M/B MPDU. The encoded versions of the M/B MPDU may be first or next encoded versions of the M/B MPDU depending upon whether multiple M/B MPDUs are transmitted during a current joint transmission. The encoded versions of the M/B MPDU are transmitted to the same M/B (or group) address for the stations that are to receive the encoded M/B MPDU.

At 218E, the MAC modules of the APs may determine whether another M/B MPDU is to be transmitted. If another M/B MPDU is to be transmitted, task 218A may be performed, otherwise task 219 may be performed. At 219, the MAC modules of the APs may determine whether another joint transmission is to be performed. Task 218 may be performed if another joint transmission is to be performed, otherwise the method may end at 220.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The wireless communications described in the present disclosure can be conducted in full or partial compliance with IEEE standard 802.11-2012, IEEE standard 802.16-2009, and/or IEEE standard 802.20-2008. In various implementations, IEEE 802.11-2012 may be supplemented by other IEEE 802.11 standards, such as draft IEEE standard 802.11ac, draft IEEE standard 802.11ad, draft IEEE standard 802.11ah, IEEE standard 802.11n, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A first access point comprising:
a physical layer module;
a parameter module configured to, via the physical layer module, (i) negotiate a first parameter with a second access point, and (ii) negotiate a second parameter with the second access point, wherein the first parameter indicates a key, wherein a first basic service set of the first access point overlaps a second basic service set of the second access point, wherein the first basic service set includes a plurality of stations, and wherein the second basic service set includes one or more of the plurality of stations;
a medium access control module configured to receive a first frame; and
a security module configured to encrypt the first frame based on the key to generate a first encrypted version of the first frame,
wherein
the first encrypted version of the first frame matches a second encrypted version of the first frame,
the second encrypted version of the first frame is generated by the second access point,
the physical layer module is configured to, based on the first parameter and during a joint transmission of the first frame by the first access point and the second access point, transmit the first encrypted version of the first frame to the plurality of stations according to a first address while the second access point transmits the second encrypted version of the first frame to the one or more of the plurality of stations according to the first address,
the second parameter indicates whether the first access point is to transmit a synchronization frame to the second access point prior to the physical layer module transmitting the first frame to the plurality of stations,
the synchronization frame indicates to the second access point that the first access point is to transmit the first frame, and the physical layer module is configured to transmit the first frame a predetermined period after transmitting the synchronization frame to the second access point.

2. The first access point of claim 1, wherein:
the first frame is a medium access control protocol data unit;
the first frame comprises the first address or a second address; and
the parameter module is configured to negotiate a third parameter with the second access point, wherein the third parameter indicates the second address.

3. The first access point of claim 2, wherein the second address is an address of the first access point.

4. The first access point of claim 1, wherein the first frame is a multicast frame or a broadcast frame.

5. The first access point of claim 1, wherein the synchronization frame indicates the first parameter.

6. The first access point of claim 1, wherein:
the parameter module is configured to negotiate a third parameter with the second access point; and
the third parameter indicates a service period, the physical layer module transmits the first frame to the plurality of stations during the service period while the second access point transmits the first frame to the one or more of the plurality of stations during the service period.

7. The first access point of claim 1, further comprising:
a first timer; and
a synchronization module configured to perform a timer synchronization process to synchronize the first timer of the first access point with a second timer of the second access point,
wherein the physical layer module is configured to, within a predetermined period of the timer synchronization process being completed in which the first timer of the first access point is synchronized with the second timer of the second access point, transmit the first frame to the plurality of stations while the second access point transmits the first frame to the one or more of the plurality of stations.

8. The first access point of claim 1, further comprising a synchronization module configured to synchronize a first timer of the first access point to a second timer of the second access point,
wherein the physical layer module is configured to, based on the first timer and simultaneously with the transmission of the first frame by the second access point, transmit the first frame to the plurality of stations.

9. The first access point of claim 1, wherein: the medium access control module is configured to (i) check a state of a transmission medium, (ii) perform a backoff procedure when the transmission medium is busy, and (iii) transmit the synchronization frame to the second access point subsequent to completing the backoff procedure.

10. The first access point of claim 1, wherein:
the parameter module is configured to negotiate a third parameter with the second access point; and
the third parameter is a length of an aggregate medium access control protocol data unit.

11. The first access point of claim 1, wherein:
the parameter module is configured to, via the physical layer module, negotiate a third parameter with the second access point;
the first parameter corresponds to a first service period;
the third parameter corresponds to a second service period; and
the physical layer module is configured to, based on the third parameter and during a joint transmission of a second frame by the first access point and the second access point, transmit the second frame to the plurality of stations while the second access point transmits the second frame to the one or more of the plurality of stations.

12. The first access point of claim 1, wherein:
the parameter module is configured to negotiate a third parameter with the second access point;
the third parameter indicates a sequence control number; and
the first frame includes the sequence control number.

13. A method of performing a joint transmission, the method comprising:
negotiating a first parameter with a second access point via a physical layer module of a first access point, wherein the parameter indicates a key;
subsequent to the negotiating of the first parameter, receiving a first frame at a medium access control module of the first access point;
encrypting the first frame based on the key to generate a first encrypted version of the first frame, wherein the first encrypted version of the first frame matches a second encrypted version of the first frame, and wherein the second encrypted version of the first frame is generated by the second access point;
checking a state of a transmission medium;
if the transmission medium is busy, performing a backoff procedure;
transmitting a synchronization frame to the second access point subsequent to completing the backoff procedure, wherein the synchronization frame indicates to the second access point that the first access point is to transmit the first frame; and
based on the first parameter and during the joint transmission of the first frame by the first access point and the second access point, transmitting the first encrypted version of the first frame from the first access point to a plurality of stations according to a first address while the second access point transmits the second encrypted version of the first frame to one or more of the plurality of stations according to the first address, wherein the first frame is transmitted from the first access point a predetermined period after the transmitting of the synchronization frame to the second access point,
wherein a first basic service set of the first access point overlaps a second basic service set of the second access point, wherein the first basic service set includes the plurality of stations, and wherein the second basic service set includes the one or more of the plurality of stations.

14. The method of claim 13, further comprising negotiating a second parameter with the second access point, wherein:
the first frame is a medium access control protocol data unit;
the first frame comprises the first address or a second address;
the second parameter indicates the second address; and
the second address is an address of the first access point.

15. The method of claim 13, further comprising negotiating a second parameter with the second access point, wherein:
the second parameter indicates whether the first access point is to transmit the synchronization frame to the second access point prior to the physical layer module transmitting the first frame to the plurality of stations; and
the synchronization frame indicates the first parameter.

16. The method of claim 13, further comprising:
performing a timer synchronization process to synchronize a first timer of the first access point with a second timer of the second access point; and
within a predetermined period of the timer synchronization process being completed, transmitting the first frame from the first access point to the plurality of stations while the second access point transmits the first frame to the one or more of the plurality of stations.

17. The first access point of claim 1, wherein the key is a key group temporal key or a group master key.

18. The first access point of claim 1, wherein:
the medium access control module is configured to (i) perform a time synchronization function with a medium access control module of the second access point, and (ii) determine whether a first synchronization frame is to be generated;
the physical layer module is configured to, when the first synchronization frame is to be generated, (i) perform a backoff procedure subsequent to the time synchronization function being performed by the medium access control module, (ii) transmit the first synchronization frame to the second access point, and (iii) perform the joint transmission subsequent to the transmission of the first synchronization frame; and
the physical layer module is configured to, when the first synchronization frame is not to be generated, perform the joint transmission without performing the backoff procedure and transmitting the first synchronization frame.

19. The first access point of claim 18, wherein:
the key is a group temporal key;
the parameter module is configured to negotiate a group master key; and
the medium access control module is configured to, based on the group temporal key and the group master key, encrypt the first frame to provide the first encrypted version of the first frame, wherein the second encrypted version of the first frame matches the first encrypted version of the first frame.

20. The first access point of claim 18, wherein:
the physical layer module is configured to, subsequent to transmitting the first frame and when the first synchronization frame is generated and a second frame is to be transmitted, perform the backoff procedure again and transmit a next synchronization frame; and
the physical layer module is configured to, subsequent to transmitting the first frame and when the first synchronization frame is not generated and the second frame is to be transmitted, transmit the second frame without performing the backoff procedure and transmitting the next synchronization frame.

21. The first access point of claim 1, wherein the physical layer module is configured to:
prior to performing a plurality of joint transmissions along with the second access point, perform a time synchronization function with a medium access control module of the second access point to synchronize the first access point with the second access point, wherein one of the plurality of joint transmissions includes the transmission of the first encrypted version of the first frame; and
subsequent to the time synchronization function being performed and for each of the plurality of joint transmissions, (i) encrypt a corresponding one of a plurality of frames, and (ii) transmit the encrypted one of the plurality of frames while the second access point transmits an encrypted version of the one of the plurality of frames, wherein the plurality of frames includes the first frame.

22. The first access point of claim 21, wherein the physical layer module is configured to, for each of the plurality of joint transmissions, transmit a corresponding synchronization frame to the second access point.

23. A first access point comprising:
a physical layer module;
a parameter module configured to, via the physical layer module, negotiate a first parameter with a second access point, wherein a first basic service set of the first access point overlaps a second basic service set of the second access point, wherein the first basic service set includes a plurality of stations, and wherein the second basic service set includes one or more of the plurality of stations; and
a medium access control module configured to (i) receive a first frame, (ii) perform a time synchronization function with a medium access control module of the second access point, and (iii) determine whether a first synchronization frame is to be generated,
wherein the physical layer module is configured to,
based on the first parameter and during a joint transmission of the first frame by the first access point and the second access point, transmit the first frame to the plurality of stations according to a first address while the second access point transmits the first frame to the one or more of the plurality of stations according to the first address,
when the first synchronization frame is to be generated, (i) perform a backoff procedure subsequent to the time synchronization function being performed by the medium access control module, (ii) transmit the first synchronization frame to the second access point, and (iii) perform the joint transmission subsequent to the transmission of the first synchronization frame, and
when the first synchronization frame is not to be generated, perform the joint transmission without performing the backoff procedure and transmitting the first synchronization frame.

24. A first access point comprising:
a physical layer module;
a parameter module configured to, via the physical layer module, negotiate a first parameter with a second access point, wherein a first basic service set of the first access point overlaps a second basic service set of the second access point, wherein the first basic service set includes a plurality of stations, and wherein the second basic service set includes one or more of the plurality of stations; and
a medium access control module configured to receive a first frame,
wherein the physical layer module is configured to,
based on the first parameter and during a joint transmission of the first frame by the first access point and the second access point, transmit the first frame to the plurality of stations according to a first address while the second access point transmits the first frame to the one or more of the plurality of stations according to the first address,
prior to performing a plurality of joint transmissions along with the second access point, perform a time synchronization function with a medium access control module of the second access point to synchronize the first access point with the second access point, wherein one of the plurality of joint transmissions includes the transmission of the first frame, and subsequent to the time synchronization function being performed and for each of the plurality of joint transmissions, (i) encrypt a corresponding one of a plurality of frames, and (ii) transmit the encrypted one of the plurality of frames while the second access point transmits an encrypted version of the one of the plurality of frames, wherein the plurality of frames includes the first frame.

* * * * *